(12) United States Patent
Horwich et al.

(10) Patent No.: US 11,348,137 B2
(45) Date of Patent: May 31, 2022

(54) COMPUTER APPARATUS AND METHOD FOR DETERMINING RESPECTIVE VALUE FOR CONTENT FOR DISPLAY USING RESPECTIVE VALUE ALGORITHM ASSOCIATED WITH THE CONTENT

(71) Applicant: KING.COM LIMITED, St. Julians (MT)

(72) Inventors: Adam Horwich, London (GB); Fernando Diaz, Barcelona (ES)

(73) Assignee: KING.COM LTD., St. Julians (MT)

( * ) Notice: Subject to any disclaimer, the term of this patent is extended or adjusted under 35 U.S.C. 154(b) by 235 days.

(21) Appl. No.: 15/973,954

(22) Filed: May 8, 2018

(65) Prior Publication Data

US 2018/0322531 A1 Nov. 8, 2018

Related U.S. Application Data

(60) Provisional application No. 62/503,000, filed on May 8, 2017.

(51) Int. Cl.
*G06Q 30/00* (2012.01)
*G06Q 30/02* (2012.01)
*G06N 5/02* (2006.01)
*G06N 5/00* (2006.01)
*G06N 20/00* (2019.01)

(52) U.S. Cl.
CPC ......... *G06Q 30/0254* (2013.01); *G06N 5/003* (2013.01); *G06N 5/02* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 9,996,853 B2* | 6/2018 | Myers | ................. | G06F 16/9535 |
| 2004/0162759 A1* | 8/2004 | Willis | ..................... | A63F 13/79 |
| | | | | 705/14.66 |
| 2010/0228558 A1* | 9/2010 | Corcoran | ............... | G06Q 30/02 |
| | | | | 705/1.1 |
| 2014/0067494 A1* | 3/2014 | Squires | .................. | G06Q 50/22 |
| | | | | 705/14.1 |
| 2014/0106877 A1* | 4/2014 | Knutsson | ................ | G07F 17/32 |
| | | | | 463/31 |
| 2014/0304295 A1* | 10/2014 | Eriksson | ................. | A63F 13/10 |
| | | | | 707/769 |
| 2014/0337174 A1* | 11/2014 | Lin | .................... | G06Q 30/0269 |
| | | | | 705/26.61 |
| 2018/0053212 A1* | 2/2018 | Beattie, Jr | ............ | H04W 4/021 |

OTHER PUBLICATIONS

John F. Magee, Decision Trees for Decision Making, Jul. 1964, Harvard Business Review (Year: 1964).*
Jessica Miller, Benefits of Decision Tree Analysis, Mar. 4, 2014, Usability Lab (Year: 2014).*

* cited by examiner

*Primary Examiner* — Naresh Vig
(74) *Attorney, Agent, or Firm* — Saul Ewing Arnstein & Lehr LLP

(57) ABSTRACT

In a computer apparatus, at least processor is arranged to determine values for two or more candidate advertisements. Based on the determined values, one of the candidate advertisements is selected. The selected advertisement is displayed on a user interface.

16 Claims, 6 Drawing Sheets

S1 determine values for each candidate content

S2 select in dependence on the determined values one of the candidate content

S3 display on user interface selected content

COMPUTER APPARATUS AND METHOD FOR DETERMINING RESPECTIVE VALUE FOR CONTENT FOR DISPLAY USING RESPECTIVE VALUE ALGORITHM ASSOCIATED WITH THE CONTENT

CROSS-REFERENCE TO RELATED APPLICATIONS

This application is based on, and claims priority to U.S. Provisional Application No. 62/503,000, filed May 8, 2017, the entire contents of which being fully incorporated herein by reference.

FIELD OF THE INVENTION

Some embodiments relates to a computer apparatus and method provided in a computer apparatus. An improved user interface of said computer apparatus is provided in some embodiments. Some embodiments provide an improved computer technology. Some embodiments relate to a computer program or computer program product. Some embodiments relate to a computer apparatus which is configured to determine which of a plurality of candidate options is provided on a user interface.

BACKGROUND OF THE INVENTION

It is common for advertisement content to be presented to a user when a user is online using a computer device. For example, a user may be presented with an advertisement or promotional material provided by the user's computer device. For example, the user may be browsing an internet site, using a search engine, using an "app" or playing a computer game. In some systems, an advertisement content provider may bid for advertisement slots and if successful, that advertisement content provider will provide the advertisement content which is presented to a particular user device.

However, having advertisement content selected on the basis of a bidding system may provide an unsatisfactory user interface.

Some embodiments may seek to improve the user interface of computer apparatus.

Some embodiments may seek to improve the computer technology to provide a more efficient computer apparatus.

SUMMARY OF THE INVENTION

According to an aspect, there is provided a computer apparatus, said computer apparatus comprising: at least one processor, said at least one processor configured to determine a respective value associated with a plurality of candidate content, at least one of said candidate content comprising an advertisement and select in dependence on said determined values one of said candidate content; and a user interface configured to display the selected candidate content.

The at least one processor may be configured to determine said respective values using one or more input parameters, said at least one processor using one or more value determining algorithms.

The value determining algorithm may comprise a decision tree.

The one or more value determining algorithms used may be dependent on information associated with a user of said computer apparatus.

The information associated with a user of said computer apparatus may be dependent at least one of: the user; and a segment in which the user is provided.

The least one candidate content value may be provided by a first value determining algorithm and at least one candidate content value for different content may be provided by a second value determining algorithm.

The computer apparatus may comprise a receiver configured to receive from a server said candidate content with information about a respective value determining algorithm.

The input parameters may comprise one or more of: one or more parameters from a server; one or more parameters available on said computer apparatus but not communicated to a server; one or more parameters available on the computer apparatus; one or more parameters relating to said content; one or more parameters relating to a context in which the user is interacting with said computer apparatus; and a number of impressions.

The context in which said user is interacting with said computer apparatus may comprise one or more of: playing a computer implemented game, interacting with an internet site, interacting with an app, interacting with a social networking site, interacting with email, and interacting with a messaging application.

The at least one processor may be configured to cause a computer implemented game to be played and at least one of said input parameters comprises a parameter relating to said computer implemented game.

At least one of said value determining algorithms may comprise a plurality of levels, with the output from one level being dependent on a value of at least one first input parameter and the output from a next level being dependent on the output from the one level and a value of at least one second input parameter.

The at least one processor may be configured to cause a computer implemented game to be played and at least one of said first and second input parameters comprises at least one parameter relating to said computer implemented game.

The computer apparatus may comprise a receiver configured to receive at least one candidate content when said computer apparatus is online and output the selected candidate content when said computer apparatus is offline.

The at least one processor may be configured to use at least one threshold to filter the determined values.

The candidate content may comprise at least one of: an advertisement; an in app promotion; a cross promotion; and information relating to a context in which said candidate content is provided.

The at least one processor may be configured to determined updated respective values of said plurality of candidate content, wherein for at least one of said candidate content, the updated respective value is changed from a previous respective value.

According to an aspect, there is provided a computer implemented method in a computer apparatus, said computer method comprising: determining, by at least one processor, a respective value associated with a plurality of candidate content, at least one of said candidate content comprising an advertisement; selecting in dependence on said determined values one of said candidate content; and displaying on a user interface the selected candidate content.

The method may comprise determining said respective values using one or more input parameters, using one or more value determining algorithms.

The or each value determining algorithm may comprise a decision tree.

The one or more value determining algorithms used may be dependent on information associated with a user of said computer apparatus.

The information associated with the user of said computer apparatus may be dependent at least one of: the user; and a segment in which the user is provided.

The least one candidate content value may be provided by a first value determining algorithm and at least one candidate content value for different content may be provided by a second value determining algorithm.

The method may comprise receiving, by a receiver, from a server said candidate content with information about a respective value determining algorithm.

The input parameters may comprise one or more of: one or more parameters from a server; one or more parameters available on said computer apparatus but not communicated to a server; one or more parameters available on the computer apparatus; one or more parameters relating to said content; one or more parameters relating to a context in which the user is interacting with said computer apparatus; and a number of impressions.

The context in which said user is interacting with said computing apparatus may comprise one or more of: playing a computer implemented game, interacting with an internet site, interacting with an app, interacting with a social networking site, interacting with email, and interacting with a messaging application.

The method may comprise causing a computer implemented game to be played and at least one of said input parameters comprises a parameter relating to said computer implemented game.

At least one of said value determining algorithms may comprise a plurality of levels, with the output from one level being dependent on a value of at least one first input parameter and the output from a next level being dependent on the output from the one level and a value of at least one second input parameter.

The method may comprise causing a computer implemented game to be played and at least one of said first and second input parameters comprises at least one parameter relating to said computer implemented game.

The method may comprise receiving, by a receiver, at least one candidate content when said computer apparatus is online and output the selected candidate content when said computer apparatus is offline.

The method may comprise using at least one threshold to filter the determined values.

The candidate content may comprise at least one of: an advertisement; an in app promotion; a cross promotion; and information relating to a context in which said candidate content is provided.

The method may comprise determining updated respective values of said plurality of candidate content, wherein for at least one of said candidate content, the updated respective value is changed from a previous respective value.

According to an aspect, there is provided a computer implemented method in a user device comprising: determining in said user device a value associated with a plurality of candidate advertisements; selecting in said user device in dependence on said determined values which one of candidate advertisements is to output; and outputting at said user device said the candidate advertisement which is to be selected for output.

The determining said value may comprise using at least one value determining algorithm.

All of the candidate advertisements may be associated with the same value determining algorithm.

At least two of said candidate advertisements may be provided with different associated value determining algorithms.

At least one value determining algorithm may be dependent on a user of said user device.

The at least one value determining algorithm may be dependent on a segment of said user of said user device.

The method may comprise receiving from a server said candidate advertisements with information about a respective value determining algorithm.

The value determining algorithm may comprises a decision tree.

At least one of said value determining algorithms may comprise a plurality of parameters to be used in determining a respective value for a candidate algorithm.

At least one parameter may comprise a parameter the value of which is not communicated to an associated server.

At least one parameter may comprise a parameter relating to said advertisement.

One of the parameters relating to said advertisement may comprise number of impressions.

At least one parameter may relate to a context in which the user is interacting with said user device.

The context in which said user is interacting with said device comprises one or more of: playing a computer implemented game, interacting with an internet site, interacting with an app, interacting with a social networking site, interacting with email, and interacting with a messaging application.

The method may comprise receiving at least one candidate advertisement when said computer device is online and outputting the candidate advertisement which is to be selected for output when said computer device is offline.

The selecting may comprise filtering the determined values to remove values which are below a given threshold.

The selecting may comprise selecting the candidate advertisement associated with a highest determined value.

The candidate advertisement may comprise at least one of: an advertisement; an in app promotion; and a cross promotion.

According to an aspect, there is provided a computer apparatus, said computer apparatus comprising at least one processor and at least one memory including computer code for one or more programs, the at least one memory and the computer code configured, with the at least one processor, to cause the apparatus at least to: determine a value associated with a plurality of candidate advertisements; select in said user device in dependence on said determined values which one of candidate advertisements is to output; and output said the candidate advertisement which is to be selected for output.

The at least one memory and the computer code may be configured, with the at least one processor, to determine said value using at least one value determining algorithm.

All of the candidate advertisements may be associated with the same value determining algorithm.

At least two of said candidate advertisements may be provided with different associated value determining algorithms.

At least one value determining algorithm may be dependent on a user of said user device.

The at least one value determining algorithm may be dependent on a segment of said user of said user device.

The at least one memory and the computer code may be configured, with the at least one processor, to receive from a server said candidate advertisements with information about a respective value determining algorithm.

The value determining algorithm may comprises a decision tree.

At least one of said value determining algorithms may comprise a plurality of parameters to be used in determining a respective value for a candidate algorithm.

At least one parameter may comprise a parameter the value of which is not communicated to an associated server.

At least one parameter may comprise a parameter relating to said advertisement.

One of the parameters relating to said advertisement may comprise number of impressions.

At least one parameter may relate to a context in which the user is interacting with said user device.

The context in which said user is interacting with said device comprises one or more of: playing a computer implemented game, interacting with an internet site, interacting with an app, interacting with a social networking site, interacting with email, and interacting with a messaging application.

The at least one memory and the computer code may be configured, with the at least one processor, to receive at least one candidate advertisement when said computer device is online and output the candidate advertisement which is to be selected for output when said computer device is offline.

The at least one memory and the computer code may be configured, with the at least one processor, to filter the determined values to remove values which are below a given threshold.

The at least one memory and the computer code may be configured, with the at least one processor, to select the candidate advertisement associated with a highest determined value.

The candidate advertisement may comprise at least one of: an advertisement; an in app promotion; and a cross promotion.

A computer readable non-transitory storage medium carrying one or more sequences of instructions which when run on at least one processor cause the process to perform the following steps: determine a value associated with a plurality of candidate advertisements; select in said user device in dependence on said determined values which one of candidate advertisements is to output; and output said the candidate advertisement which is to be selected for output.

According to some aspects, there is provided a program product comprising a computer-readable storage device including a computer-readable program, wherein the computer-readable program when executed on a computer causes the computer to perform any one or more of the method steps described previously.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF FIGURES

Reference is made by way of example only to the accompanying drawings in which.

DETAILED DESCRIPTION OF SOME EMBODIMENTS

Some embodiments may be directed to improving computer technology. Some embodiments may provide an improved user interface for electronic devices. In some embodiments, the data to be displayed is determined as is how that data is displayed. Some embodiments may improve on conventional user interfaces to improve the efficiency of using user devices.

Figure 1:
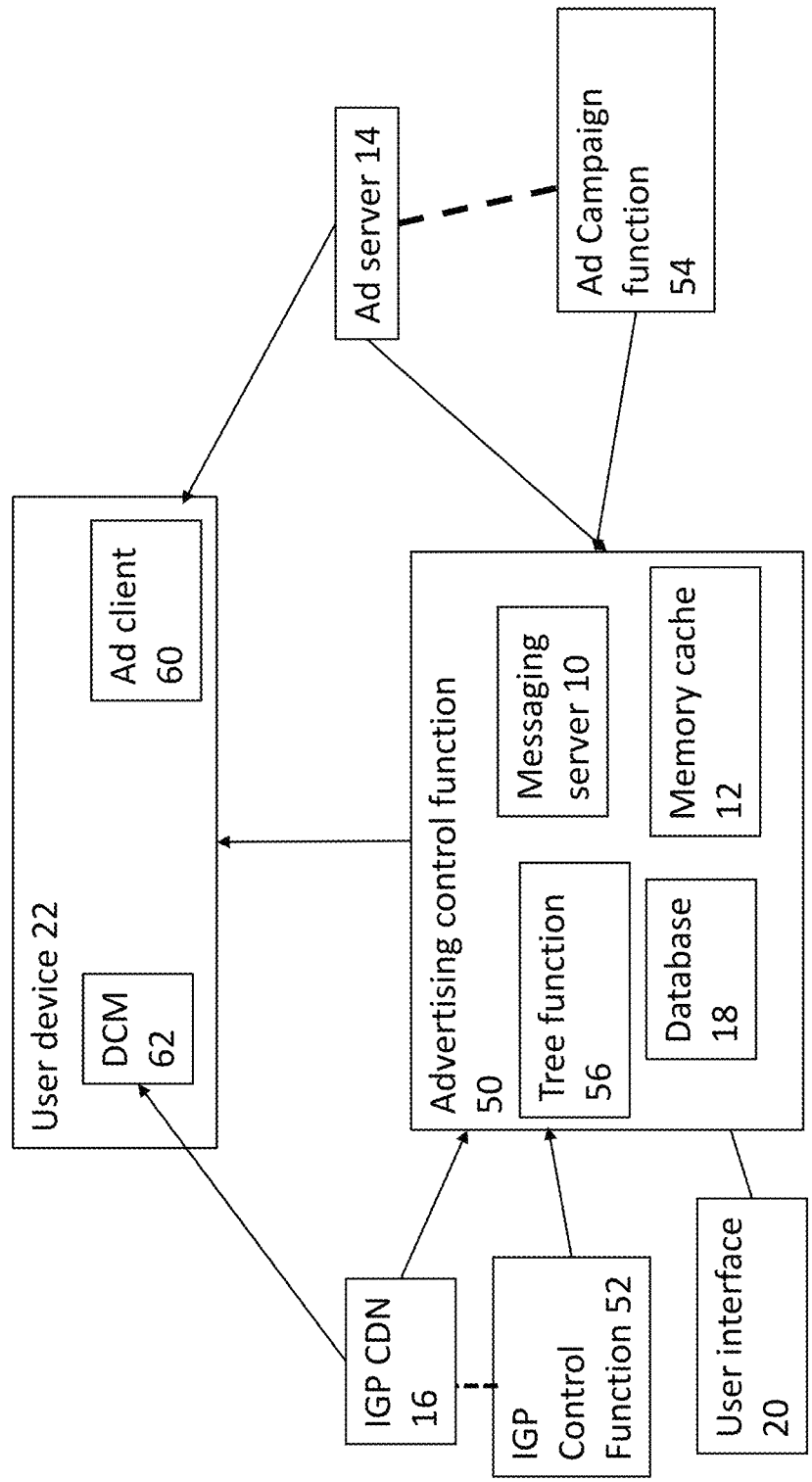
FIG. 1 schematically shows a system of an embodiment.

Reference is made to FIG. 1 which schematically shows a system of an embodiment. This may represent the service layer. A user device 22 is provided on which a client is provided. The client may comprise computer executable code. This client may cause a computer implemented game to be played, internet content to be accessed, an app to be used or the like.

A first source 14 of first advertisement content may be provided. In some embodiments, more than one source of advertisement content may be provided. The source of advertisement content may be one or more ad servers. The ad server may provide internal and/or external advertisement content. Internal content may be provided by the same provider which provides the client. External content may be provided by a different provider to that of the client. The first advertisement content may comprise video advertisements. It should be appreciated that alternatively or additionally the advertisements may take any other suitable form.

The first source 14 of advertisement content is configured to provide one or more advertisements to the user device. In particular, the advertisement content may be provided to an advertisement client 60 on the user device.

Information associated with the advertisement may be provided to an advertising control function 50 which will be described in more detail later.

A first advertisement source control function 54 is provided in some embodiments. This control function, may for example provide campaign information to the advertising control function. This will be used to determine which of the advertisements provided by the first source of advertisements are to be candidate advertisements. In some embodiments, this control function may be provided as part of the first source 14 of advertisement content and/or as part of the advertising control function. In some embodiments, this first advertisement source control function may be configured to provide the advertising content from the first source to the user device, directly or via the advertising control function.

A second source 16 of advertisement content may be provided. The second source 16 of advertisement content may be an in game promotion IGP, an in app promotion IAP or cross promotion. The second source of advertisement content may be a content delivery network. The second source of advertisement content is configured to provide one or more IGPs or other promotion to the user device 22. The second source of advertisement content may be configured to provide IGPs to a download content module DCM 62 in the user device 22 which is configured to handle the download of the required content.

The second source of advertisement content may be configured to provide information associated with the IGP or the like to the advertising control function 50.

A second advertisement source control function 52 is provided in some embodiments. This second advertisement source control function, may for example provide campaign information to the advertising control function 50. This will be used to determine which of the IGPs and/or IAPB and/or the like provided by the second source of advertisements are to be candidate advertisements. In some embodiments, this second advertisement source control function may be provided as part of the second source of advertisement function and/or as part of the advertising control function. In some embodiments, this second advertisement source control function may be configured to provide the advertising content from the second source to the user device, directly or via the advertising control function.

In some embodiments communication between one or both of the sources of advertisement content on the one hand and the advertising control function may be via the respective advertisement source control function 52 and 54, schematically represented by the dotted lines. In this latter embodiments, there may not be a direct connection between the respective source of advertising content and the advertising control function.

It should be appreciated that in some embodiments, one of the first and second sources of advertisement content may be omitted. In some embodiments, one or more additional and/or alternative sources of advertisement content may be provided. The advertisement content may be any suitable advertisement content.

In some embodiments, the DCM 62 may additionally support the advertisement from the first source of advertising content. In that scenario, the advertisement client 60 may be omitted. In some embodiments, the advertisement client may support the advertising content from the second source of advertising content. In that scenario, the DCM may be omitted.

In some embodiments, the advertising control function may be configured to provide the advertising content from at least one of the first and second advertising content sources to the user device. In that scenario, it may not be necessary to have an additional path between the respective advertising content source and the user device.

The advertising control function 50 comprises a messaging function which may be provided by a messaging server 10. The messaging server 10 will provide messages to the user device. These messages may be via or in response to one or more GET messages. These messages will be described later.

The advertising control function has a decision function 56. In some embodiments, this decision function is configured to determine for at least one advertisement content, a decision tree. This will be described in more detail later.

The advertising control function may comprise 50 may comprise a database which stores data from one or more of: at least one of the one or more advertisement sources; the respective source control function; and input from a user interface 20. It should be appreciated that, where more than one advertisement source is provided, not all of the advertisement sources may necessarily provide data to be stored in the database.

In some embodiments, a plurality of databases may be provided. Different advertisement sources may be associated with different databases.

The user interface 20 may be provided to allow an administrator or computer system to set configuration and/or select a selection algorithm. The set configuration and/or the set selection algorithm may be stored in the database.

The advertising control function 50 may comprise a memory cache 12 which is configured to store recent data of the database. In particular the memory cache may store for the user device 22 one or more of: configuration information; a selection algorithm; an evaluation algorithm definition; an ad evaluation algorithm per ad. Some or all of this information may be provided to the user device via or in response to one or more GET messages or the like.

Some proposed advertisement technology are not able to decide which ad is more valuable for a given player in a specific moment of a game loop based on the value that ad will provide. Some embodiments may address this by improving the computer technology.

Some proposed systems are not able to change the way the system prioritises between the different ads available for a player without a game release. Some embodiments may address this by improving the computer technology.

Some embodiments may provide the ability to choose in real time which ad is more valuable to be displayed for a specific player in a specific moment of the game loop. This may thus provide an improved user interface of the user device.

Some embodiments may not require any integration beyond the service layer for any ads delivery. This may improve the computer technology.

Some embodiments may support online and offline scenarios.

Some embodiments may be able to define and change the rules (or decision trees) to be used in the selection process without a game release. This may improve the computer technology.

Some embodiments may allow the maximum value and/or other defined objective for an opportunity to display an ad to the player to be obtained. This may thus provide an improved user interface of the user device.

Some embodiments may make the decision in the client-side. Some embodiments may use data which is maintained in the client. This may not always be provided to the server or there may be a delay in providing that data to the server. This data may not need to be provided to the server and any issues relating to security of that data may be avoided.

Some embodiments relate to an ad campaign. This may comprise one or more of rewarded advertisements and installed promotions.

An ad impression may comprise a specific display of an ad campaign.

Some embodiments may use arbitration which is the action of selecting an ad to display based on an evaluation and selection algorithm. This may improve the computer technology.

Configuration is the mechanism provided by the improved computer technology to select for a given game/placement which system to apply (yield management/weightings).

An evaluation algorithm provided by the improved computer technology computes the yield of an ad based on one or more of a pre-fetched/provided value, placement, ad, number of impressions and the like.

An external ad provider may be a video ad provider (for example Google, Facebook or the like).

The number of impressions is the number of times an advertisement has been already displayed to a player.

Placement is a moment in a game loop in which the game allows a service layer to display a message to the player. This may be controlled by the improved computer technology to thereby provide an improved user interface.

A pre-fetch value is a value set to a given campaign when no provided value is available for a given placement, number of impressions and/or the like.

A provided value is a value requested from a provider (for example video ads, IGP in game promotion) and is requested as an input into a selection algorithm.

A provider may be an internal or external ad provider (for example IGP, video Ads)

The selection algorithm may apply an algorithm to select an ad to display based on the yield value of each ad. This may improve the computer technology. This may thus provide an improved user interface of the user device.

A threshold may be defined which is the minimum yield value for an ad to enter the selection algorithm.

A yield value may be the output value of the evaluation algorithm which represents the value an impression is worth at a given moment in time for a specific player. This value will be an input of the selection algorithm.

Figure 2:
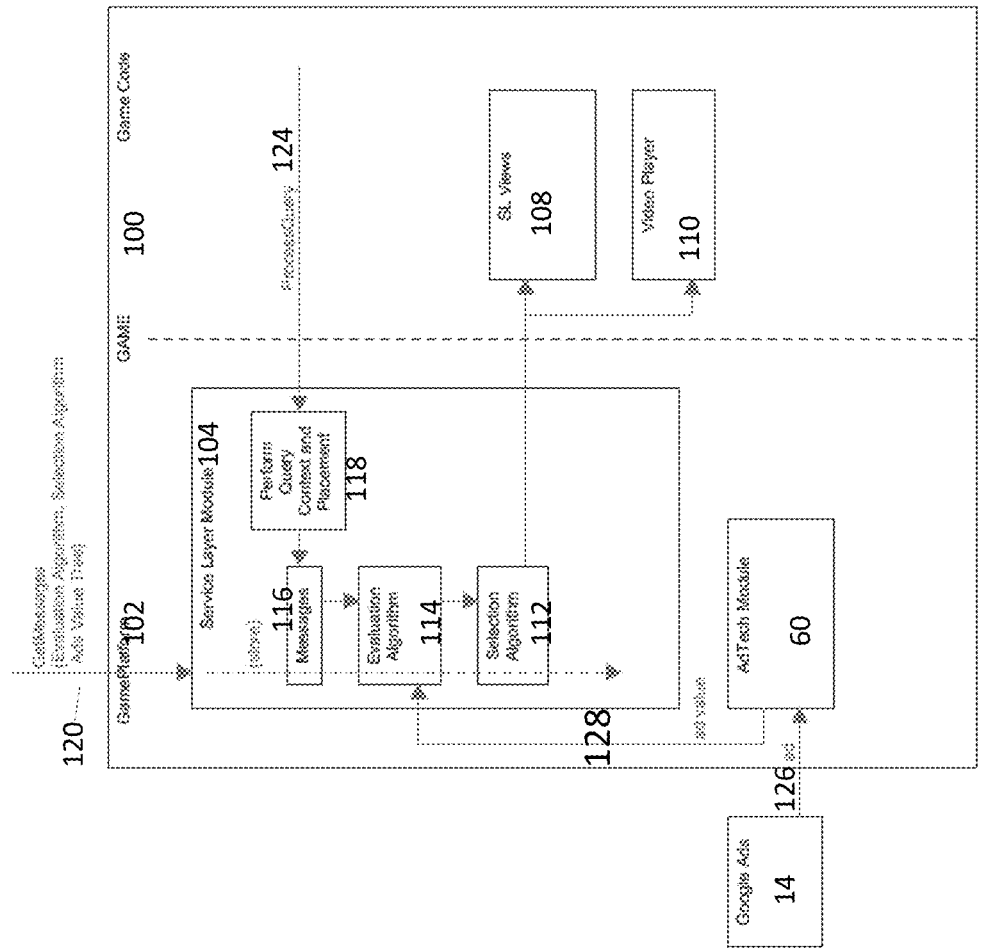
FIG. 2 schematically shows a block diagram of a game side scheme.

Reference is made to FIG. 2 which schematically shows a client on a user device which is user to control the user interface. This may provide an improved user interface. As mentioned previously, this client can support any suitable application, internet browsing, accessing of internet sites or the like. By way of example only, the client of FIG. 2 is configured to provide a computer implemented game side scheme. In FIG. 2, the game platform is referenced 102 and the game code is referenced 100.

The game platform 102 comprises a service layer module 104 and the advertisement client 60. The service layer module 104 receives messages referenced 120. These messages may be via or in response to one or more GET messages. The messages may provide information about one of more of: the evaluation algorithm; the selection algorithm; advertising value information; a decision tree; one or more thresholds; one or more applicable formula(s) and/or matrix(ces) to compute real values from default values; and hardcoded video ad values. The information which is received in the messages is stored in a data store in a message function 116.

The service layer module 104 comprises a perform query context and placement function 118. This receives a process query 124 from the game code 100. The perform query context and placement function 118 provides an output to the message function 116. The messages function 116 provides an output to an evaluation algorithm function 114 which in turn provides an output to a selection algorithm function 112. The evaluation algorithm 114 may receive ad value information from the advertisement client 60, which is outside the service layer module 104. The advertisement client 60 receives advertisement information 126 from the first source of advertisements 14. Alternatively, the ad value information may be received in any other suitable manner such as via or in response to one or more GET values or the like.

The game code comprises a service layer view function 108 and a video player function 110 which both receive an output from the selection algorithm function 112. The service layer view function and/or the video player function are arranged to cause the advertisement content which has been selected to be provided to the user.

Figure 3:
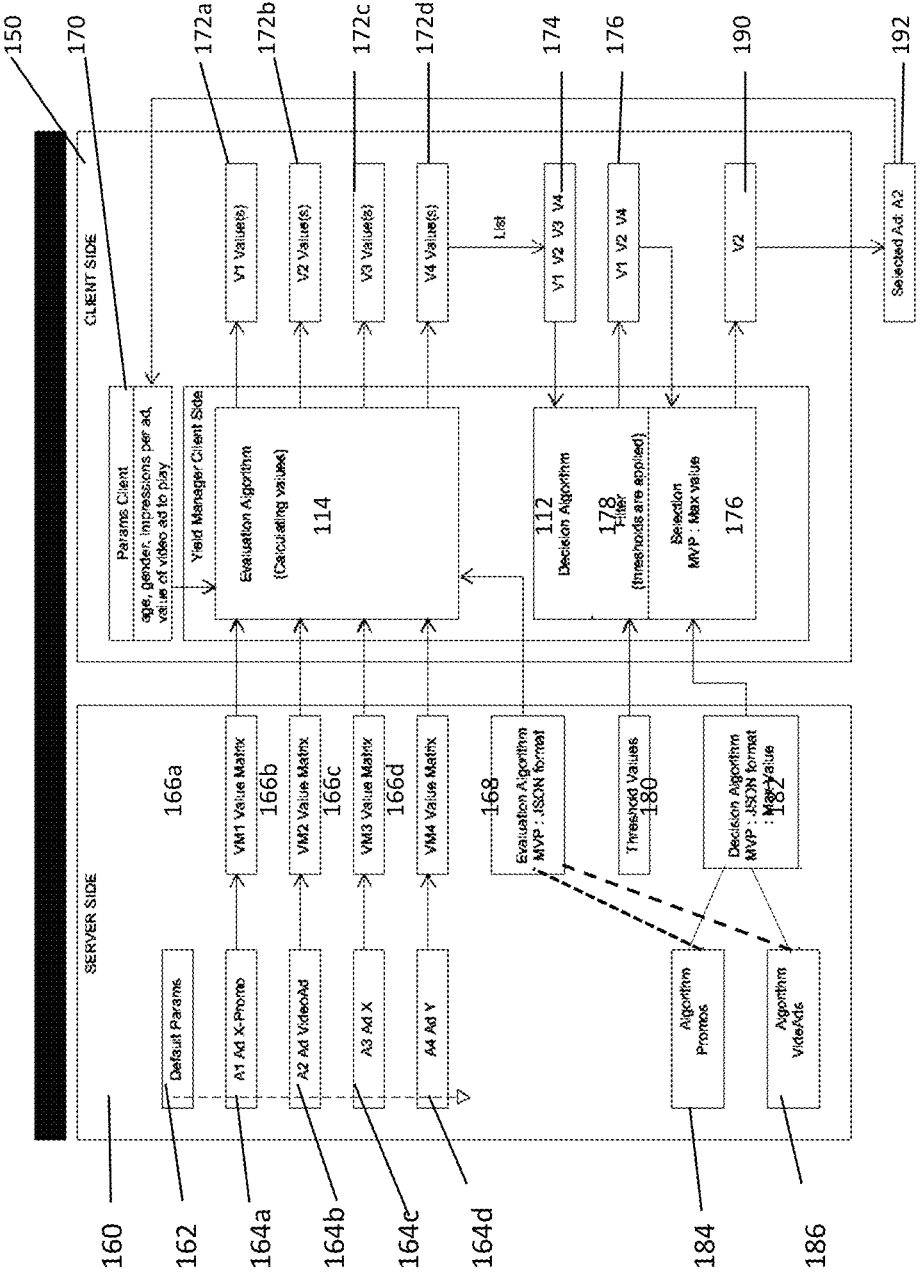
FIG. 3 schematically shows a workflow in a client and a server.

Reference is made to FIG. 3 which shows a server side 160 of the service layer along with the client side 150 of the service layer. The service layer on the client side 150 is provide by the service layer module 104.

On the server side, default parameters 162 may be provided. Example advertisements A1 to A4 are referenced 164a to d. It should be appreciated that there may be more or less than 4 advertisements. Each of the advertisements may be a candidate advertisement. The advertisements may be any suitable advertisement content. For example the first advertisement A1 may be a cross promotion and/or IGP and/or any other promotion. The second advertisement may be a video advertisement and so on.

Each advertisement 164 is associated with a corresponding value matrix VM which are respectively referenced 166a to d. Each of the value matrices 166 is configured to provide a respective output to the evaluation algorithm function 114 provided on the client side. The value matrices may be provided via or in response to one or more GET messages.

On the server side, there is an evaluation algorithm function 168 which provides an output to the evaluation algorithm 114 on the client side 150. This will control the evaluation algorithm performed on the client side. This may be provided via or in response to one or more GET messages.

Threshold values are provided by a threshold function 180 on the server side to a filter function 178 of the selection algorithm 112. The one or more threshold values may be provided via or in response to one or more GET messages.

A decision algorithm function 182 on the server side is configured to provide an output to the selection algorithm 112. This may be provided to the client via or in response to one or more GET messages. This will control the selection algorithm performed by the selection algorithm 112.

In some embodiments, one or both of the evaluation algorithms and the decision algorithm may support promotion type advertisements and video advertisements, this be schematically represented by respective functional blocks 184 and 186. In some embodiments, this may be provide inputs to the evaluation algorithm to control how promotion type advertisements and video advertisements are treated.

The client side will now be described. The client parameters from a client parameter function 170 are provided to the evaluation algorithm. These parameters may be parameters received from the server side and/or parameters which are on the user device. The parameters may be parameters which are not available to or communicated to the server side. The parameters may comprise one or more of software and device specific parameters. In some embodiments, one or more of these parameters may be communicated or available to the server.

The parameters may be any suitable parameters. By way of example, the parameters may comprise one or more of age, gender, impressions per ad, value of video ad to play, game variables, games downloaded, pre-fetched value, placement, one or more device parameters, one or more parameters associated with the user, client associated parameters, application related parameters and the like. The evaluation algorithm provides for each of the advertisements A1 to A4 a respective calculated value V1 to V4 referenced 172a to d. These values are determined for each advertisement based on its respective value matrix and the evaluation algorithm received from the server side. One or more of the client parameters and/or one or more parameters provided by the server may be used to determine the value. This value is the yield value.

These values V1-V4 are provided in a list format 174 to provide an input to a decision algorithm or selection algorithm 112. The decision or selection algorithm has a threshold comparing part 178 provided by a filter and a value selecting part 176. Thus the yield values provide an input to the selection algorithm. The filter 178 is controlled by one or more of the threshold values 180 provided from the server side. The threshold value provides the minimum yield value of an ad to enter the selection algorithm. This filtering may remove one or more of the values V1 to V4 in the list 174 to provide an updated candidate list 174 which is input to the value selecting part 176 of the selection algorithm 112. The selection part of the selection algorithm selects one of the advertisements based on the values and the decision algorithm provided by the server.

Any suitable criteria may be used by the selection part. For example, the advertisement associated with a highest value, a minimum value, an interpolated value and an exact value may be selected. The selection part provides an output 190 indicating the selected value which is then used to cause the selected advertisement 192 to be selected and displayed or the like on the interface. Information on which advertisement has been selected may be stored in the client parameter function 170.

Some embodiments may provide the ability to choose in real time which advertisement is more valuable to be displayed for a specific player in a specific moment of user interaction. For example, where the user is playing a game, the particular point or placement with respect to the game may influence the effectiveness of the advertisement. As the choosing of the advertisement is done in real time on the client device, this advantage can be achieved.

Some embodiments may make use of decision trees. Decision trees are provided by the value matrices. The decision trees are logic which may be created and optionally updated on the server-side. The decision trees are evaluated and executed at the client side (i.e. on the user device) which allows arbitration as to what is the most appropriate content to display to a particular player or group of players at a specific moment in time.

The decision trees may apply to an advertisement placement and/or a segment of population and/or an individual user and/or a group of users and/or per advertisement and/or a group of advertisements. Decision trees may be updated based on one or more of server-side logic and client-side logic.

In some embodiments, the client segments used may not overlap.

In some embodiments, there may be a single campaign per placement. The advertisement which is served may be decided and provided in real-time by at least one advertisement source.

One example of a decision tree will now be described with reference to FIG. 4 which implements the following:

yield_value=tree_value[MIN:impressions,EXACT: remainingLives,MAX:goldBarAmount].

Figure 4:
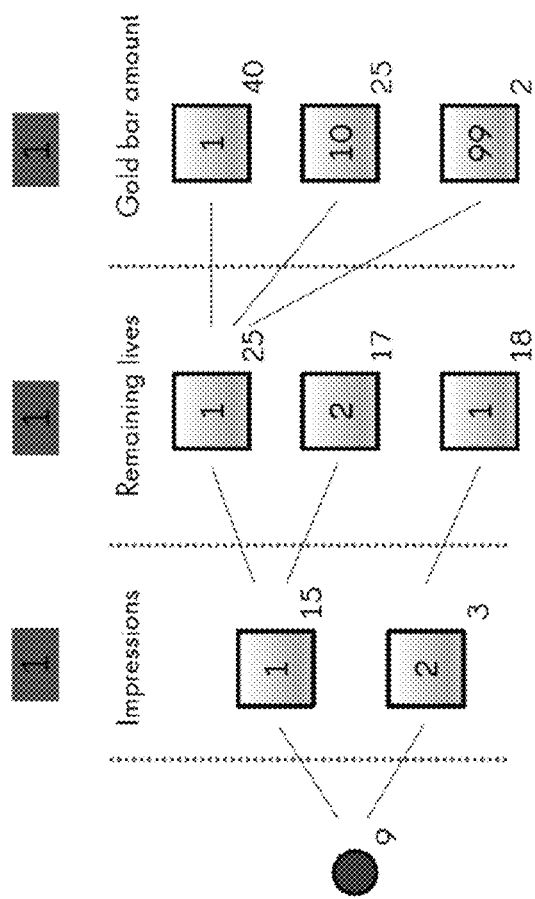
FIG. 4 shows an example decision tree used in some embodiments.

As can be seen from FIG. 4, for ad campaign 9, first the number of impressions is considered. If there has been one impression, the value is 15. If there has been 2 impressions the value is 3. Next, in the next layer of the tree the remaining lives are considered. If there has been one impression, the tree has an option of 1 or 2 remaining lives with values of 25 and 17 respectively. If there has been two impressions, then the tree has the option of 1 remaining life with a value of 18. Next the tree considers the gold bar amount. For the one remaining life option, there is a gold bar amount option of 1, 10 and 99, with values of 40, 25 and 2 respectively. As can be seen, different values of different parameters may be taken into account when determining the yield. The parameters may be one or more game parameters and/or one or more parameters associated with the advertisement.

Other examples of formulas are:

yield_value=tree_value[MIN:impressions,EXACT: remainingLives,MAX:goldBarAmount]

yield_value=tree_value[MIN:impressions,EXACT: remainingLives,INTERPOLATE:goldBarAmount]

The decision tree may be simple and have a single layer or level. Other embodiments, may have two or more levels. Each level may associated with a given parameter or set of parameters. The example of FIG. 4 has three levels with each level associated with one parameter. It should be appreciated that the number of options provided in each level may comprise one or more, generally two or more. The number of options can be the same or different in each levels.

In some embodiments, an option of a level may be a single value or a range of values.

It should be appreciated that the decision tree is one way of implementing an algorithm to provide a yield value. In other embodiments, the algorithm may be defined simply by a program, by a matrix or in any other suitable manner.

The decision trees may have a threshold that applies globally to all advertisement providers and their campaign. In some embodiment, all games will share a same decision tree. In other embodiments, a decision tree may be specific to a particular game. In some embodiments, one advertisement may be associated with a different decision tree to another advertisement.

In some embodiments, the value V determined may be a yield value. This is a value measurement of an impression that can be displayed to a player. Yield may provide a consistent and shared way of calculating the value an impression provides. The value may be an economic criteria and/or another criteria. In some embodiments, the value determined provides a baseline to assess what is the most desirable impression to show to a player, taking into account the relevant one or more criteria. This is regardless of the provider of that impression. This may be used to the decision on what impression to display for a given player at a particular moment of time.

In some embodiments, there may be two types of yield. A first is a default yield. This is the average yield for a given provider or advertisement source. A default yield may alternatively or additionally be associated with different types of advertisement. Its calculation can vary for each provider, however a common set of premises may be applied for consistency. It is used by the yield system client-side to sort in what order campaigns from the different providers are evaluated.

There is also the real yield which is the yield value at impression level. Each impression of the same campaign can have a different yield.

The default value may be provided with a respective advertisement or may be separately provided, for example for each provider and/or type of advertisement.

A default value is required as the real value may not initially be available. If the real yield is available, then the need for a default value can be avoided in some embodiments. Some embodiments may only use real values.

In some embodiments, a mix of default and real values may be used if the real value is unavailable.

In some embodiments, where a default value is used, the real value may requested at a suitable time. If the real value is not returned, the default value is continued to be used. If the real value is returned, this replaces the default value.

In some embodiments, when an advertisement is selected for placement, a check may need to be made with a provider if the advertisement content can be used. At this time the real value may be requested. The provider can either accept or reject the impression of the advertisement.

In other embodiments, this check may be omitted and the advertisement content is used.

In some embodiments, the real time value information is attempted to be retrieved before this check.

There may be different types of advertisement content. For example the advertisement content may comprise one or more of an install promotion, a retention promotion, a multilink promotion, a Google Ad, a Facebook Ad, an ad provided by the provider of the game.

The threshold may be the minimum yield or value a campaign or advertisement provides in order to be eligible for an impression. It enables the ability for the selection algorithm to choose not to display any impression at all. For example only campaigns or advertisement content with a yield or value equal or higher than the threshold may be used.

A campaign provide for an impression one or more of a schedule, a source game and a targeting population. There are different types of campaigns that can group into two categories: retention campaigns and rewarded campaigns. Retention campaigns may comprise one or more of install promotions, retention promotions, and multilink take overs. Rewarded campaigns may comprise ad campaigns.

The DCM module is the component which manages the download of assets which may be needed for the messages, for example images, videos and/or the like.

The video player may be able to play video advertisements using a VAST tag (Video Ad Serving Template).

It should be appreciated that placement of advertising content may be taken into account. A placement opportunity may only be suitable for some types of advertisement content or a provider may only want a particular advertisement to have a particular placement. For example a banner placement is unsuitable for some video advertisement content.

In some embodiments, the decision tree may comprise a placement level which results in the decision tree only providing a value above the threshold value if the placement is appropriate.

In other embodiments, the evaluation which is performed will be for a specific type of placement so only advertisements suitable for the specific placement will be considered.

In other embodiments, the placement is not taken into account in the evaluation part, but this may be taken into account in the selection process. The selection algorithm may take into account the placement opportunity when determining which advertisement to use. For example, the advertisement with the highest value suitable for a particular type of placement may be selected.

There may be four different stages in the flow.

1. Configuration. In this stage there is configuration of the rules (for example decision trees) for the different sets of players (buckets) related to them. There may be configuration of the campaigns for example for the cross promotion campaigns and the video advertisement campaigns. This may be the content and targeting of the respective campaigns. This may take place at the server side.

2. Delivery of the rules and campaigns to the client.

3. Filtering and pre-fetching. In this stage there is evaluation of the decision tree to filter the advertisements which do have the required value enough to be displayed and pre-fetch everything needed for the advertisements with enough value.

4. Execution. This involves the selection and display of the highest value advertisement for a player when a placement has been reached.

In some embodiments, advertising content may be pre-fetched such that when the decision is made to select a particular advertisement for a particular placement, the advertisement content is available in the user device.

In other embodiments, the content is fetched only after a particular advertisement for a particular placement has been made.

In some embodiments, content is fetched for each candidate advertisement after it has been evaluated, optionally after the filtering. This may mean that for a next placement, one or more candidate advertisements may have already been downloaded.

A player may be in a particular segment or group of players. The decision tree(s) may be dependent on the segment. If a player is moved from one segment or group to another, the decision trees(s) for that different segment are provided to the user device.

One or more decision trees may be updated or created. These decision trees may have one or more of a new threshold, new message, new rules etc. When a decision tree is updated or created, the tree will be communicated to the relevant user devices.

The advertising control function may have visibility of the execution and evaluation of the decision trees and the result of this. The advertising control function may take into account the frequency cap rules to be applied to messages and providers.

A different decision tree can be set up per target group which may comprise one or more players. A different decision tree may be set up for each type of advertisement placement.

An initial hardcoded decision tree may be set up. The initial decision tree configuration may be hardcoded.

A target population may be defined. For example a particular type of player may be targeted, for example a player which has a particular game option preference or game playing characteristic. Alternatively or additionally players in a particular segment or group may be targeted. The decision tree may be set up for the selected group. For that selected group each type of advertisement content is giving a default yield value. By way of example only:

For Group A: Cross promotion—$A; Google Ad—$B; Facebook Ad—$C; Ad from the game provider: $D; and threshold—$E.

For Group B: Cross promotion—$F; Google Ad—$G; Facebook Ad—$H; Ad from the game provider—$I; and threshold—$E.

The values in the different groups may the same or different.

For each advertisement, there may be a configured campaigns:

This may comprise for a particular advertisement, a yield value and a frequency cap. A campaign may comprise a plurality of different advertisements, each with a respective yield value and a frequency cap. There may be a frequency cap at the provider level.

The decision trees may be provide per placement and target population of one or more devices. The trees may be the same or different depending on the computer activity of the user. For example, the trees may be the same or different for different games.

The service layer module may picks up the decision trees and campaigns. This may be available for all providers that apply to the given core identity and/or all placements existing in the game or the like.

The service Module evaluates the decision trees and downloads the required creatives and assets associated with the advertisements.

One example which deals with campaign and provider caps will now be described. The service module identifies the provider with highest default yield value.

The service module may pull or otherwise obtain from the server (if not already available in the client) of the provider chosen, one or more of the real yield for each of the campaigns when available and the capping rules at the provider level.

It should be appreciated, that in some embodiments, the real yield is not available until later and accordingly the default value is used initially.

The campaigns may be sorted based on their yield (for example from higher to lower) if this has not already been done.

The provider capping (PC) rules may be evaluated for the highest yield campaign. If the PC rules are not met (in other words, the limit on the number of impressions for the provider has not been met) the campaign with highest yield is then chosen. If they are met, then the provider with the next highest default yield is considered.

The campaign capping (FC) rules are also evaluated. If the FC rules are met (i.e., the campaign has frequency caps have been achieved already), the next campaign with the next highest yield for that same provider is chosen and FC rules are evaluated again. This process runs until FC are not met or there are no more campaigns for that provider. Then the next provider is selected and the process starts over again.

If the FC rules are not met, the yield is assessed against the threshold. If the yield higher or equal to threshold, the assets required for that campaign (e.g. Video, Images, etc.) are downloaded. It should be appreciated that the campaigns, capping rules and real yield values may already be available in the client. In this scenario, the campaign may be sorted based on their real yield. For each campaign, a check is made to see if provider caps are met or not. If not, a check is made to see if the campaign capping rules are met or not. If not, the real yield of the candidate advertisement is checked against the threshold. If the real yield is higher than the threshold, then the impression is displayed.

One or other of the provider and campaign caps may be included as parameters on the associated decision tree of the respective advertisement.

Alternatively or additionally, one or other of the provider and campaign caps may be considered in the selection algorithm.

Alternatively or additionally, one or other of the provider and campaign caps may be considered in the evaluation algorithm.

Alternatively or additionally, one or other of the provider and campaign caps may be considered prior to the evaluation algorithm.

The decision tree may track one or more of: the decision tree has been evaluated; data used to do evaluation; result of the evaluation; tracking relating to the impression and/or clicks; and the like.

For example, cross promotions is chosen as the first provider, cross promotions and XP1, XP2, and XP3 apply. Google is chosen as the second provider and GA1 and GA2 applies. Assets for all campaigns above are downloaded.

When the advertisement placement is reached, for the first impression XP1 is displayed. For the second impression, XP2 is displayed. For the third impression, XP2 is displayed. For the fourth impression, GA1 is displayed. For the fifth impression, GA2 is displayed.

In some embodiments, in addition or as an alternative to advertising content, specific game content may have an associated decision tree which may control the placement of that content. That game content may be a game specific message, a live operation message, an in game item or the like.

The client side decision may not be event driven although in other embodiments, the decision may be event driven. In some embodiments, the price may be hard coded in the decision tree. In other embodiments, the price may provide from the advertisement providers.

In some embodiments, as the decision logic is in the client device, the client device may be configured to display advertisements even if the client device is offline.

Some embodiments allow the evaluation to be made at the latest possible time so as to accurately reflect the current user activity.

Different rules may be used in one or more of different games, for different placement, for different sources of content and different segments.

The frequency cap rules may be applied before the arbitration decision in some embodiments. If a campaign is capped it may not be included in the list of candidates.

The arbitration may uses any message (campaign) which is ready to be displayed. What "ready" means for cross-promotions and ads may be different. In the case of cross promotions, ready may mean that the cross promotion can definitely be displayed. However, in the case of an ad, ready may means that an ad has been pre-loaded but it could be the case that the ad has expired.

Different frequency caps may apply at the "messaging" level so they are independent from the arbitration handling. These frequency cap rules may be applied before arbitration. Capping and arbitration may in some embodiments be two independent layers of configuration with capping applied before arbitration.

If two campaigns have the exact same value and are the ones with the highest values the system picks one of these two. For example, the campaign with the lowest number of impressions may be picked or if equal, the one received first. Any other suitable or additional criteria may be provided in other embodiments.

Reference has been made to some embodiments which have an evaluation algorithm and a selection algorithm. This may be in provided by a single algorithm or function in some embodiments.

In some embodiments, reference has been made to a selection by the value selecting algorithm of an advertisement or similar. It should be appreciated that in other embodiments, the content for which the values are selected may be any suitable content in the alternative or in addition. For example, the content may for example be a tutorial when a game is being played. A parameter which is associated with that tutorial content (or other content) may be the number of times that content has been viewed. In some embodiments, the content may be related to the context in which the algorithm is being used. For example in the context of a computer implemented game, the content might be game play by others. The content may alternatively or additionally be any other suitable video, image and/or the like. This content may not be considered to be advertising or promotional content.

In some embodiments, values may be assigned to different content, none of which is considered to be advertising or promotional content. In some embodiments, the different content may comprise advertising content or promotional content as well as non-advertising and promotional content. In other embodiments, the content may only be advertising and promotional content.

Regardless of the content, values will be determined for the respective content using one or more value determining algorithm. It should be appreciated that one or more parameters may be dependent on the type of content.

Embodiments have been described in the context of advertisements and/or other content being placed as a user interacts with a computer implemented game. It should be appreciated that this is by way of example and other embodiments may be used in the context on any suitable interaction where the user is on-line or even off line in some embodiments.

For example some embodiments maybe provided in the context of social media interactions. By way of example only, the interactions may comprise Facebook™ interactions, Twitter™ interactions, LinkedIn™ interactions, Google™ interactions or the like.

Other embodiments may be provided in the context of messaging applications or email.

Other embodiments may be provided in the context of an interaction with a specific internet site or application.

By way of example, content such as previously discussed may be given values and based on these values, content is selected to be displayed. The particular content may be displayed in a particular location in the context in which embodiments are deployed. In other embodiments, the area where the content is displayed may be controlled by the particular context and may vary.

In the described embodiments, the decisions are made in the user device as to which content is to be displayed. In some embodiments, the decision may be made at the server side and communicated to the user device. It should be appreciated that one or more of the previously described parameters may be used in the server side decision. The algorithms used may be as previously discussed in relation to the user device.

Figure 5:
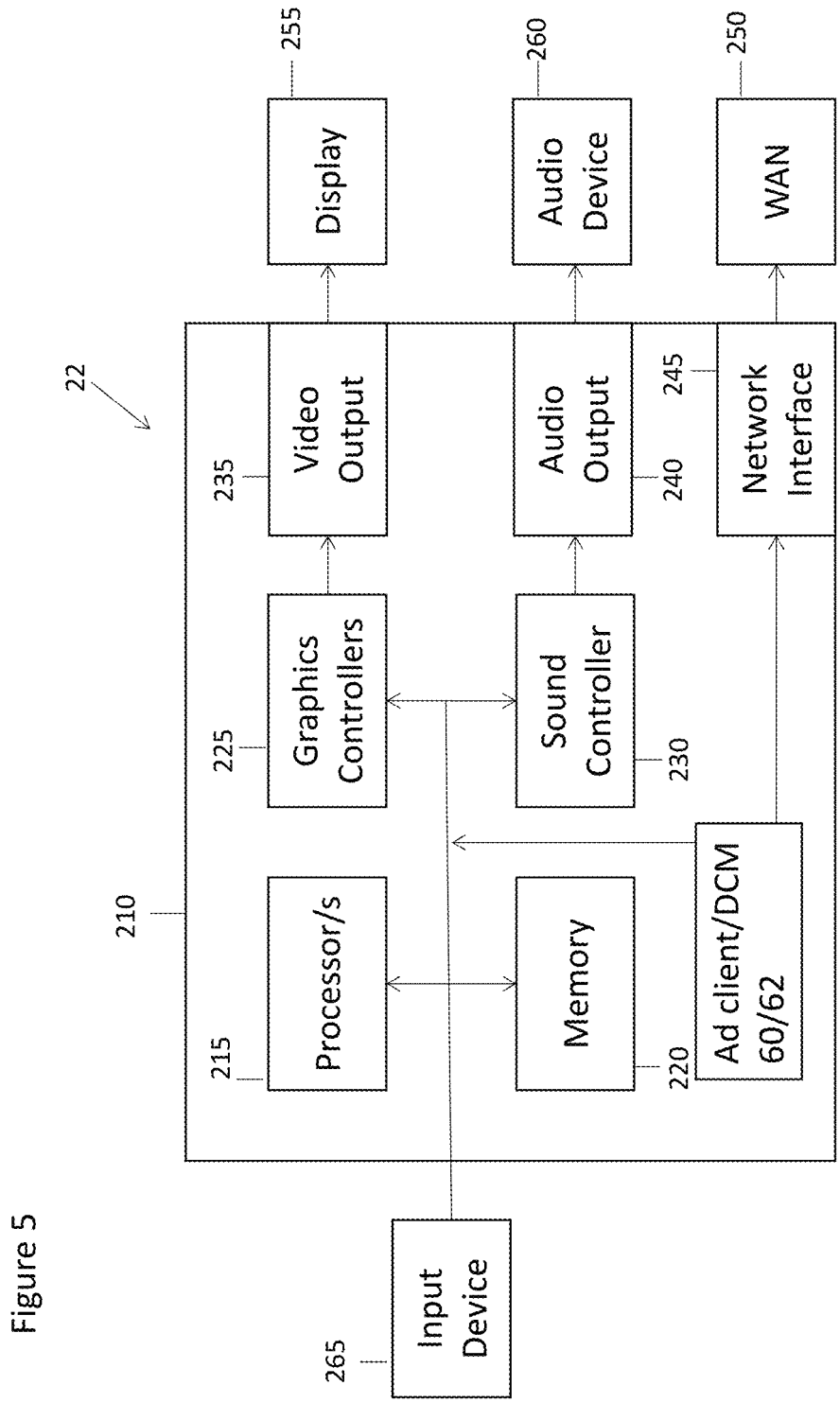
FIG. 5 shows an example user device.

A schematic view of a user device 22 according to an embodiment is shown in FIG. 5. All of the blocks shown are implemented by suitable circuitry. The blocks may be implemented in hardware and/or software. The user device may have a control part 210. The control part 210 is shown as having a graphics controller 225 and a sound controller 230. It should be appreciated that one or other or both of the graphics controller 225 and sound controller 230 may be provided by the one or more processors 215. The graphics controller 225 is configured to provide a video output 235. The sound controller 230 is configured to provide an audio output 240. The controller 210 has an interface 245 allowing the device to be able to communicate with a network 250 such as the Internet or other communication infrastructure. This allows communication with the ad server and/or games server for example.

The video output 235 is provided to a display 255. The audio out 240 is provided to an audio device 260 such as a speaker and or earphone(s). The device 22 has an input device 265. The input device can take any suitable format and can be one or more of a keyboard, mouse, touch screen, joystick or game controller. It should be appreciated that the display 255 may in some embodiments also provide the input device 265 by way of an integrated touch screen for example. The advertisements and/or other content are displayed on the display, for example.

The device comprises the ad client and/or DCM as previously described.

The blocks of the controller 210 are configured to communicate with each other by an interconnect such as a bus or any other suitable interconnect and/or by point to point communication.

It should be appreciated that in some embodiments, the controller may be implemented by one or more integrated circuits, at least in part.

The user device 22 is shown by way of example only. In alternative embodiments, one or more of the parts may be omitted. Alternatively or additionally, some embodiments may comprise one or more other parts. Alternatively or additionally, one or more parts may be combined.

Figure 6:
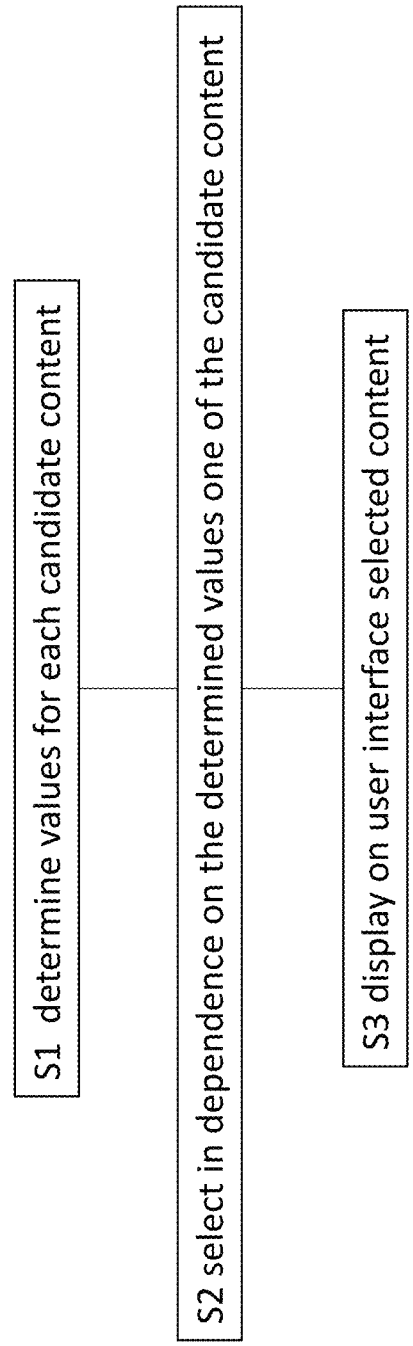
FIG. 6 shows a method of an embodiment.

Reference is made to FIG. 6 which shows a computer implemented method of some embodiments.

In step S1, it is determined by at least one processor a respective value associated with a plurality of candidate content. The content may be any of the content discussed previously. The values may be determined as outlined in any of the previously described embodiments.

In step S2, the at least one processor, selects in dependence on the determined values one of the candidate content. This selection may be as outline in any of the previous embodiments.

In step S3, there is the display on a user interface of the selected candidate content.

The code may be run on one or more processors in conjunction with one or more memories. The code may be run on the same at least one apparatus which provides the processing and/or or on at least one different apparatus. The apparatus may be at least one server or the like.

Various embodiments of methods and devices have been described in the foregoing. It should be appreciated that such may be implemented in apparatus, where the apparatus is implemented by any suitable circuitry. Some embodiments may be implemented by at least one memory and at least one processor. The memory may be provided by memory circuitry and the processor may be provided by processor circuitry. Some embodiments may be provided by a computer program running on the at least one processor. The computer program may comprise computer implemented instructions which are stored in the at least one memory and which may be run on the at least one processor.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, and/or CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more of any of the other embodiments previously discussed.

We claim:

1. A user device configured to select and display content, said user device comprising:
    a user interface configured to display content;
    a receiver configured to receive, from a server, a plurality of candidate content and information about a respective value determining algorithm of a plurality of value determining algorithms for a respective candidate content of the plurality of candidate content, wherein different candidate content of the plurality of candidate content is associated with different value determining algorithms of the plurality of value determining algorithms, wherein the respective value determining algorithm requires a set of input parameters of a plurality of input parameters, wherein the different value determining algorithms each comprise different sets of input parameters of the plurality of input parameters, and wherein at least one of the plurality of candidate content comprises an advertisement;
    at least one memory configured to store values for the plurality of input parameters; and
    at least one processor, said at least one processor configured to determine for each candidate content of the plurality of candidate content a value, wherein a respective value for a given one of the plurality of candidate content is determined using the respective value determining algorithm for the respective candidate content and the values of the set of input parameters for the respective value determining algorithm which are stored in said at least one memory, a first one of the values being determined using values of a first set of input parameters from the at least one memory and a first value determining algorithm and a second one of the respective values being determined using values of a second different set of input parameters from the at least one memory and a second value determining algorithm,
    wherein the at least one processor is further configured to select, using the determined values and a common threshold, one of said plurality of candidate content and to cause the user interface to display the selected candidate content.

2. The user device as claimed in 1, wherein said value determining algorithm comprises a decision tree.

3. The user device as claimed in claim 1, wherein the one or more value determining algorithms used is dependent on the information associated with the user of said user device.

4. The user device as claimed in claim 3, wherein said information associated with the user of said user device is dependent on at least one of: the user; and a segment in which the user is provided.

5. The user device as claimed in claim 1, wherein said input parameters comprises one or more of:
    one or more parameters from a server; one or more parameters available on said user device but not communicated to a server; one or more parameters available on the user device; one or more parameters relating to said content; one or more parameters relating to a context in which the user is interacting with said user device; and a number of impressions.

6. The user device as claimed in claim 5, wherein the context in which said user is interacting with said user device comprises one or more of: playing a computer implemented game, interacting with an internet site, interacting with an app, interacting with a social networking site, interacting with email, and interacting with a messaging application.

7. The user device as claimed in claim 1, wherein said at least one processor is configured to cause a computer implemented game to be played and at least one of said input parameters comprises a parameter relating to said computer implemented game.

8. The user device as claimed in claim 1, wherein at least one of said value determining algorithms comprises a plurality of levels, with the output from one level being dependent on a value of at least one first input parameter and the output from a next level being dependent on the output from the one level and a value of at least one second input parameter.

9. The user device as claimed in claim 8, wherein said at least one processor is configured to cause a computer implemented game to be played and at least one of said first and second input parameters comprises at least one parameter relating to said computer implemented game.

10. The user device as claimed in claim 1, wherein the receiver is configured to receive at least one candidate content when said user device is online and the selected candidate content is displayed on the user interface when said user device is offline.

11. The user device as claimed in claim 1, wherein the at least one processor is configured to use at least one threshold to filter the determined values.

12. The user device as claimed in claim 1, wherein the candidate content comprises at least one of: an advertisement; an in app promotion; a cross promotion; and information about a context in which said candidate content is provided.

13. The user device as claimed in claim 1, wherein said at least one processor is configured to determine updated respective values for said plurality of candidate content, wherein for at least one of said candidate content, the updated respective value is changed from a previous respective value.

14. A computer implemented method performed by a user device configured to select and display content, the user device comprising at least one memory, at least one processor, a user interface, and a display, which are configured to perform the method of:
    receiving by a receiver of the user device, from a server, a plurality of candidate content and information about a respective value determining algorithm of a plurality of value determining algorithms for a respective candidate content of the plurality of candidate content, wherein different candidate content of the plurality of candidate content is associated with different value determining algorithms of the plurality of value determining algorithms, wherein the respective value determining algorithm requires a set of input parameters of a plurality of input parameters, wherein the different value determining algorithms each comprise different sets of input parameters of the plurality of input parameters, and wherein at least one of the plurality of candidate content comprises an advertisement;
    storing, in at least one memory of the user device, values for the plurality of parameters;
    determining, by at least one processor of the user device, for each candidate content of the plurality of candidate content a respective value, wherein a respective value for a given one of the plurality of candidate content is determined using the respective value determining algorithm for the respective candidate content and the respective values of the required input parameters for the respective value determining algorithm which are stored in said at least one memory, a first one of the respective values being determined using values of a first set of input parameters from the at least one memory and a first value determining algorithm, and a second one of the respective values being determined using values of a second different set of input parameters from the at least one memory and a second value determining algorithm;

selecting, by the at least one processor, using the determined values and a common threshold one of the plurality of candidate content; and causing, by the at least one processor, a user interface of said user device to display the selected candidate content.

15. A computer readable non-transitory storage medium carrying one or more sequences of instructions which when run on at least one processor of a user device cause the following steps to be performed by the user device:

receiving by a receiver of the user device, from a server, a plurality of candidate content and information about a respective value determining algorithm of a plurality of value determining algorithms for a respective candidate content of the plurality of candidate content, wherein different candidate content of the plurality of candidate content is associated with different value determining algorithms of the plurality of value determining algorithms, wherein the respective value determining algorithm require a set of input parameters of a plurality of input parameters, wherein the different value determining algorithms each comprise different sets of input parameters of the plurality of input parameters, and wherein at least one of the candidate content comprises an advertisement;

storing, in at least one memory of the user device, values for the plurality of input parameters;

determining by the at least one processor of the user device, for each candidate content of the plurality of candidate content a respective value associated with the plurality of candidate content, wherein the respective value for a given one of the plurality of candidate content is determined using the respective value determining algorithm for the respective candidate content and the values of the set of input parameters for the respective value determining algorithm which are stored in said at least one memory, a first one of the respective values being determined using values of a first set of input parameters from the at least one memory and a first value determining algorithm, and a second one of the respective values being determined using a second different set of input parameters from the at least one memory and a second value determining algorithm;

selecting, by the at least one processor, using the determined values and a common threshold, one of the candidate content; and causing, by the at least one processor, a user interface of the user device to display the selected candidate content.

16. The user device of claim 1, wherein said at least one processor is configured to:

subsequently determine for each of the plurality of candidate content an updated respective value;

select, in dependence on said determined updated values, one of said plurality of candidate content; and cause the candidate content selected in dependence on the determined updated values to be displayed on the user interface.

* * * * *